Dec. 14, 1926.
B. N. BROIDO
1,610,741
CONNECTING MEANS FOR TUBULAR ELEMENTS
Filed May 24, 1924
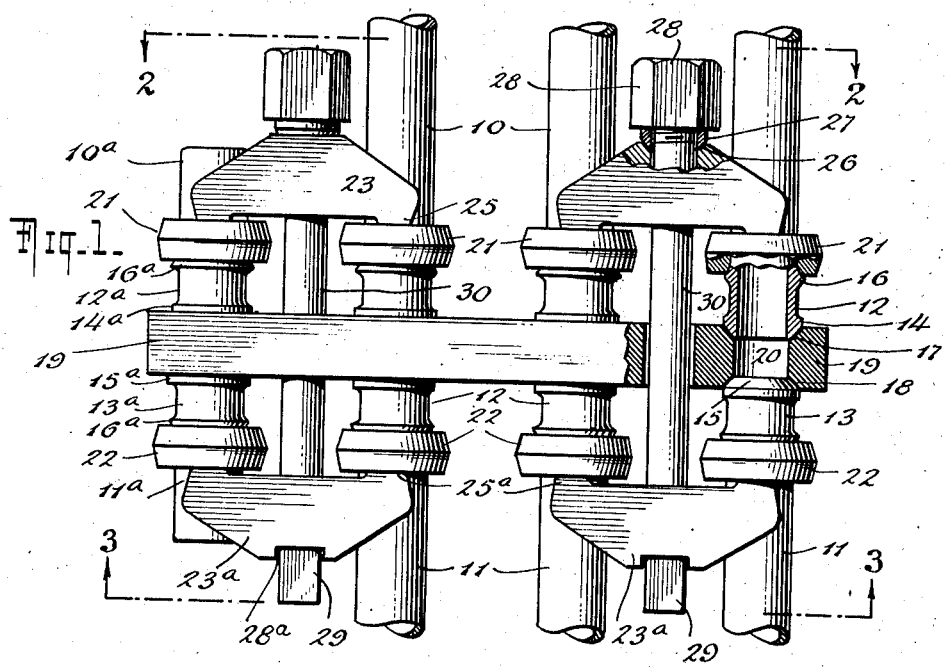
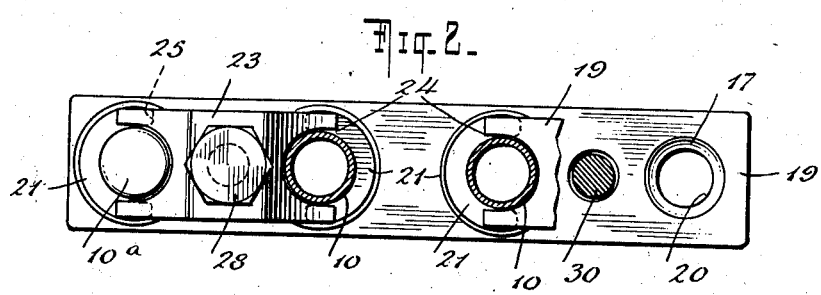
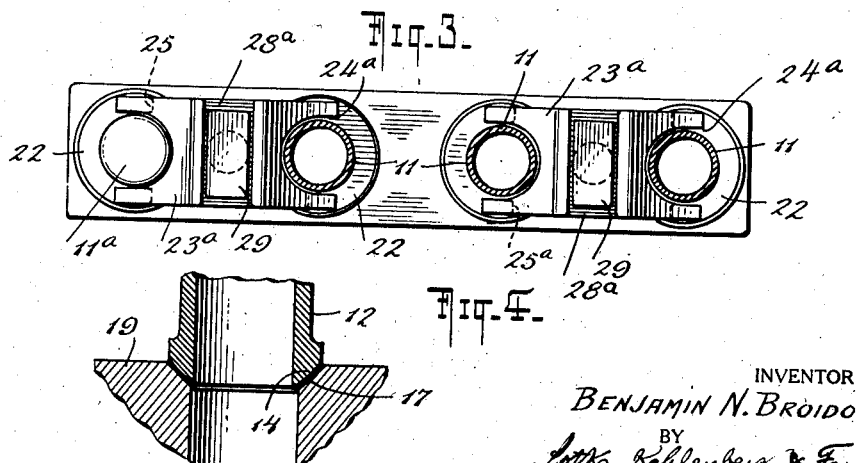
INVENTOR
BENJAMIN N. BROIDO
BY
Lotka, Kehlenbeck & Farley
ATTORNEYS Patented Dec. 14, 1926.

1,610,741

UNITED STATES PATENT OFFICE.

BENJAMIN N. BROIDO, OF NEW YORK, N. Y., ASSIGNOR TO THE SUPERHEATER COMPANY, OF NEW YORK, N. Y., A CORPORATION OF DELAWARE.

CONNECTING MEANS FOR TUBULAR ELEMENTS.

Application filed May 24, 1924. Serial No. 715,739.

This invention relates to superheaters and other structures which include tubular elements and has for its object to provide a novel and efficient means whereby tubular elements, as exemplified more particularly by superheater elements, are operatively combined in groups and connected with each other or with other structural devices. Other more specific objects will appear from the description hereinafter and the features of novelty will be pointed out in the claim.

In the accompanying drawings which illustrate an example of the invention without defining its limits, Fig. 1 is an elevation, partly in section showing a group of tubes with the invention combined therewith; Fig. 2 is a section on the line 2—2 of Fig. 1; Fig. 3 is a similar view on the line 3—3 of Fig. 1 and Fig. 4 is a section on the line 4—4 of Fig. 1 looking in the direction of the arrow.

For convenience and because the invention is particularly adapted to such use, I have shown the same in the form of a unit joint assembly especially designed for superheaters; it will be understood that under certain conditions the invention may be useful in other fields.

In the drawing 10 represents a group of superheater tubes with which the similar tubes 11 are in connection; said tubes 10 and 11, at their opposed ends being provided respectively as shown in Fig. 1 with enlarged heads 12 and 13. The heads 12 and 13 each include spherically formed outer ends 14 and 15 and have similarly formed annular shoulders 16 located at their inner ends as illustrated in Fig. 1. The spherical formed outer ends 14 and 15 are seated in conical-shaped pairs of seats or recesses 17 and 18 provided on opposite sides of a connecting member 19, each recess 17 being arranged in spaced axial registry with a corresponding recess 18 with which it is connected by a passage 20 extending transversely through the connecting member 19. By making the recesses 17 and 18 of a conical configuration and the ends 14 and 15 of the heads 12 and 13 spherical, a line contact, (as more clearly shown in Fig. 4) between the parts is obtained. The arrangement is such that when a tube 10 is engaged with the connecting member 19 in registry with its corresponding tube 11, said tubes will communicate with each other through the passages 20. The connecting member 19 is preferably provided with a plurality of conical-shaped recesses 17 and a corresponding number of recesses 18 sufficient to accommodate the tubes 10 and 11 of a given group or assembly which group ordinarily will include four pairs of tubes. In some instances the number of tubes in a given group or assembly may be less than four pairs, therefore the superfluous recesses may accommodate dummies as will appear more fully hereinafter.

Thus in the illustrated example, the member 19 is provided with four recesses 17 and four recesses 18 while the assembly or group includes but three superheater tubes 10 and three tubes 11. The fourth pair of recesses 17 and 18 therefore are provided with dummies 10ª and 11ª respectively, which are provided with heads 12ª and 13ª having spherically formed ends 14ª and 15ª corresponding to the previously described ends 14 and 15, and seated in the fourth pair of recesses 17 and 18 respectively; the heads 12ª and 13ª further include spherically formed annular shoulders 16ª similar to the annular shoulders 16.

Collars 21 and 22 are positioned respectively upon the tubes 10 and 11 in engagement with the shoulders 16 thereof; similar rings 21 and 22 being located upon the dummies 10ª and 11ª in contact with the shoulders 16ª as shown in Fig. 1. The arrangement further includes clamping members 23 which extend between each pair of tubes 10 or between a tube 10 and a dummy 10ª and are recessed as indicated at 24 to span said tubes and dummy as shown in Fig. 2. The members 23 are arranged to engage the collars 21 and may be provided with projections 25 for this purpose; the engagement of the projections 25 with the rings 21, as illustrated in the drawing, being effected upon opposite sides of each tube 10 or dummy 10ª substantially in alignment with the longitudinal axis of the tubes, so that the clamping forces exerted by the device are evenly applied and distributed. The upper surface of the clamping members 23 is recessed as at 26 to provide a seat for the reduced end of a washer 27 against which the nut 28 engages; the recess 26 preferably being of a spherical shape and the reduced end of the washer 27 being spherical so as to be self-adjusting, similar to the engagement of the ends of the tubes with the recesses 17 and 18. Additional clamping members 23ª extend between each pair of superheater tubes 11 or between a tube 11 and a dummy 11ª and said clamping members are provided with recesses 24ª having projections 25ª similar to the projections 25, whereby the engagement of the member 23ª with the collars 22 is also effected upon opposite sides of the elements 11 and dummy 11ª in the manner hereinbefore set forth. Each clamping member 23ª is provided with a groove 28ª into which the head 29 of a T-bolt 30 or its equivalent is seated as shown in Figs. 1 and 4. The bolts 30 extend through apertures 31 of the members 23ª and through aligning apertures 32 in the members 23 and project beyond the surfaces 26 of the latter; the projecting ends of the bolts 30 being screw threaded to receive the previously mentioned nuts 28.

In the practical assembling of the structure, a lower clamping member 23ª is placed in position upon an adjacent pair of tubes 11, with the projections 25ª in engagement with the collars 22 and the T-bolt 30 is inserted into the aperture 31 and its head 29 seated within the groove 28ª. A suitable prop is placed under the head 29 of the T-bolt to raise the clamping member 23ª and tubes 11 to their proper position. The next pair of tubes 11, or a tube 11 and dummy 11ª, as the case may be, are similarly propped in place. The connecting member 19 is then placed upon the ends of the tubes with the recesses 18 in engagement with the spherical ends 15 of the tubes, after which the upper set of tubes is placed in position with the spherical ends 14 within the recesses 17. The clamping members 23 are then placed over the upper ends of the bolts 30 with their projections 25 in engagement with the collars 21, the washers 27 and nuts 28 are placed upon the bolts and the nuts 28 are screwed home to clamp the parts securely in engagement. In this way the elements constituting the entire group or assembly are securely fastened together in an efficient and simple manner.

It will thus be seen that with the arrangement set forth the assembling of the various elements of the particular groups is reduced to a simple operation requiring only a minimum of skill and a comparatively short period of time, as the connecting member 19 because of its rigid bar construction serves to retain the tubes in proper relative positions and as the construction and arrangement of the clamping members enables the lower tubes 11, clamping members 23ª, bolts 30 and bar 19 to be held in position while the upper tubes are in turn supported by the bar, the hands of the workman are left free to manipulate the elements and to screw home the nuts. Furthermore, while neither the use of a ball shaped tubular member seated within a conical seat to form a line contact joint, nor the use of a spherical nut or washer seated within a similar recess is broadly new, the combination of these features in a joint assembly has many important advantages, particularly for assembling superheater tubes, as such tubes are usually installed in very restricted spaces, either within or between the tubes of boilers, where it is very difficult for the workmen to align the parts with great accuracy. It will therefore be apparent that if in the assembling of the parts the tubular elements are not exactly perpendicular to the bar 19 or if the clamps 23, 23ª are not parallel, the efficiency of the connection is not impaired.

Various changes in the specific form shown and described may be made within the scope of the claim without departing from the spirit of my invention.

I claim:

The combination with a plurality of tubular elements arranged in axially aligned pairs, of a connecting member consisting of an elongated solid bar having a plurality of spaced separate through passages therein, and a plurality of seats, located in registering pairs upon opposite faces thereof at the ends of said passages, in which the ends of said tubular elements are adapted to be engaged to form a fluid tight joint with their opposed ends fitted into one of said registering pairs of seats, and clamping means effective upon said elements whereby the ends thereof are forced into engagement with said recesses.

In testimony whereof I have hereunto set my hand.

BENJAMIN N. BROIDO.